UNITED STATES PATENT OFFICE.

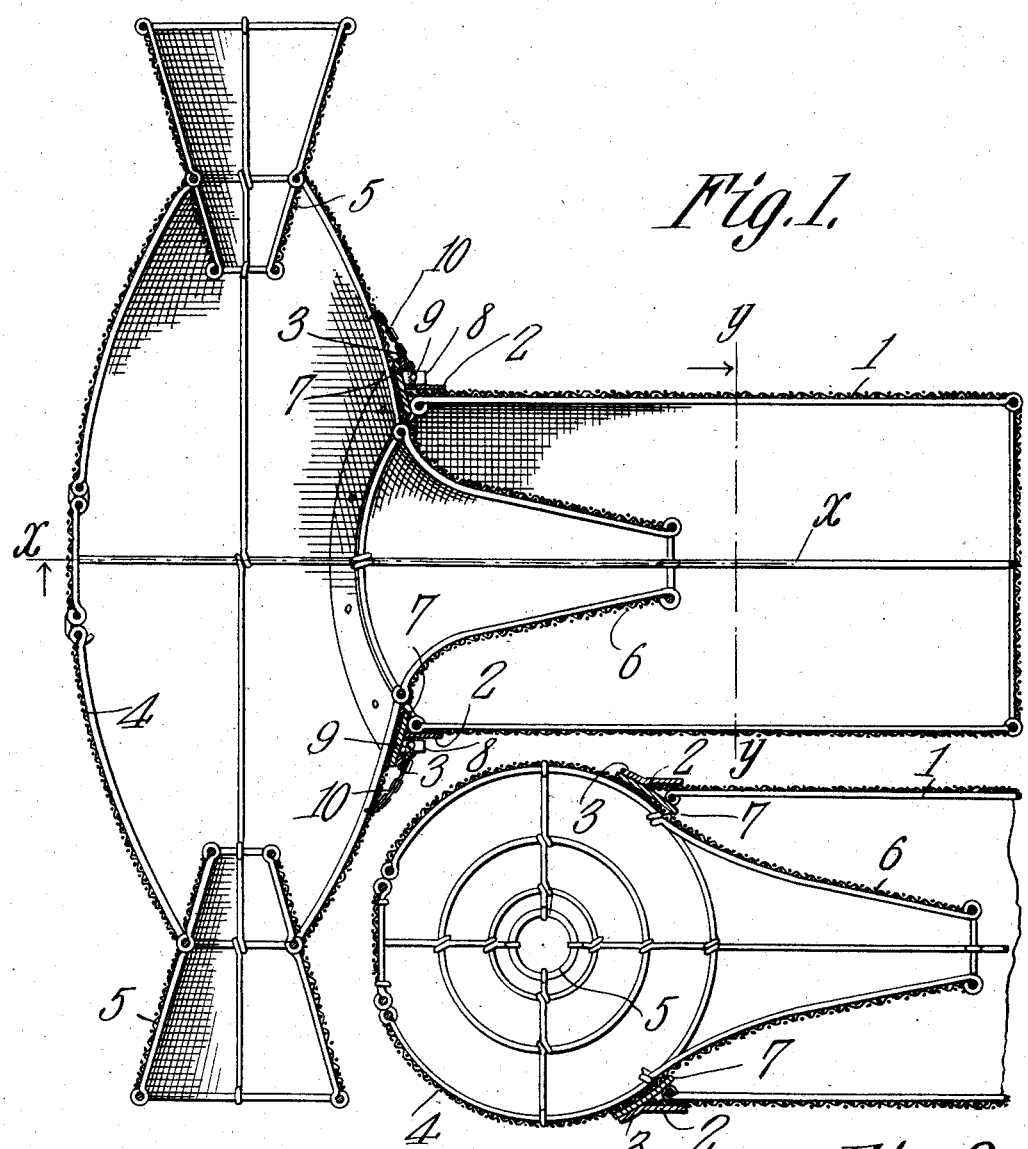

TOMAS W. LAW, OF ATLANTA, TEXAS, ASSIGNOR OF ONE-FIFTH TO MARVIN M. SCOTT, ONE-FIFTH TO JAMES B. ROBERS, ONE-FIFTH TO MALCOLM M. DUNCAN, ONE-FIFTH TO STERLING Q. CLEMONDS, AND ONE-FIFTH TO RAPHAEL P. DUNKLIN, ALL OF ATLANTA, TEXAS.

FISH-TRAP.

No. 866,147.  Specification of Letters Patent.  Patented Sept. 17, 1907.

Application filed June 25, 1907. Serial No. 380,698.

*To all whom it may concern:*

Be it known that I, TOMAS W. LAW, a citizen of the United States, residing at Atlanta, in the county of Cass and State of Texas, have invented a new and useful Fish-Trap, of which the following is a specification.

This invention relates to fish traps and its object is to provide a trap of this character having a closure of novel form, said closure constituting means whereby fish approaching the trap from different directions can pass into the closure and be directed therefrom into the body of the trap.

A still further object is to provide means whereby the closure can be securely fastened in position.

With these and other objects in view the invention consists of certain novel features of construction and combinations of parts which will be hereinafter more fully described and pointed out in the claims.

In the accompanying drawings is shown the preferred form of the invention.

In said drawings: Figure 1 is a horizontal section through the trap. Fig. 2 is a section on line $x$—$x$, Fig. 1. Fig. 3 is a section on line $y$—$y$, Fig. 1.

Referring to the figures by characters of reference, 1 designates the body of the trap, the same being in the form of a cage of wire fabric or other suitable material preferably cylindrical but which may be of any other preferred outline.

A ring 2 is secured around the open or inlet end of the cage and has an annular flange 3 provided with a desired number of apertures and which is for the purpose hereinafter set forth.

The cage is provided with a closure 4 which is ellipsoidal in form although it is to be understood that if preferred the same may be of any other desired contour. The end portions of this closure extend in opposite directions beyond the cage and are formed with funnel shaped inlets 5.

Extending from the closure at a point between the ends thereof is a funnel shaped outlet extension 6 designed to project into the cage 1 and secured to the closure and surrounding said extension is a ring 7 having a plurality of pins 8 extending therefrom and designed to project into the apertures within flange 3. Each of these pins 8 has a small opening extending transversely through it for the reception of a locking pin 9 which may be connected to the closure 4 by means of chains 10 or other flexible devices.

In using the trap described the same is submerged after the closure has been secured to the cage in the manner described. Fish, while approaching the trap, will enter the closure through the inlets 5 and will pass therefrom through the outlet 6 into the cage 1. Should it be desired to remove the fish the pins 9 are disengaged from the pins 8 whereupon the closure can be lifted from the cage.

What is claimed is:

1. A fish trap comprising a cage, a closure opening thereinto, said closure having oppositely disposed inlets, and means for detachably securing the closure to the cage.

2. In a fish trap the combination with a cage; of a hollow closure extending therebeyond in opposite directions and opening thereinto, said closure having oppositely disposed inlets, and means for detachably securing the closure to the cage.

3. In a fish trap the combination with a cage having an open end, and a ring surrounding said end; of a hollow closure having an outlet extension normally projecting into the open end of the cage, ring engaging means extending from said closure, and means for securing said ring engaging means in locked position, said closure extending in opposite directions beyond the cage and having oppositely disposed inlets.

In testimony that I claim the foregoing as my own, I have hereto affixed my signature in the presence of two witnesses.

TOMAS W. LAW.

Witnesses:
E. HUME TALBERT,
HERBERT D. LAWSON.